Oct. 3, 1939.   A. V. BEDFORD   2,174,561
DISPLAY APPARATUS AND METHOD
Filed Dec. 14, 1938
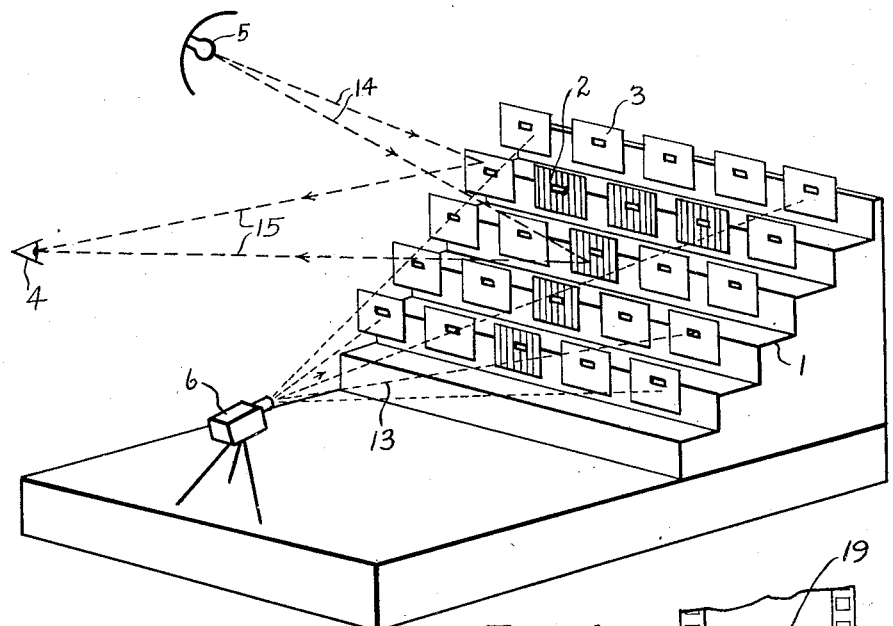
Fig. 1
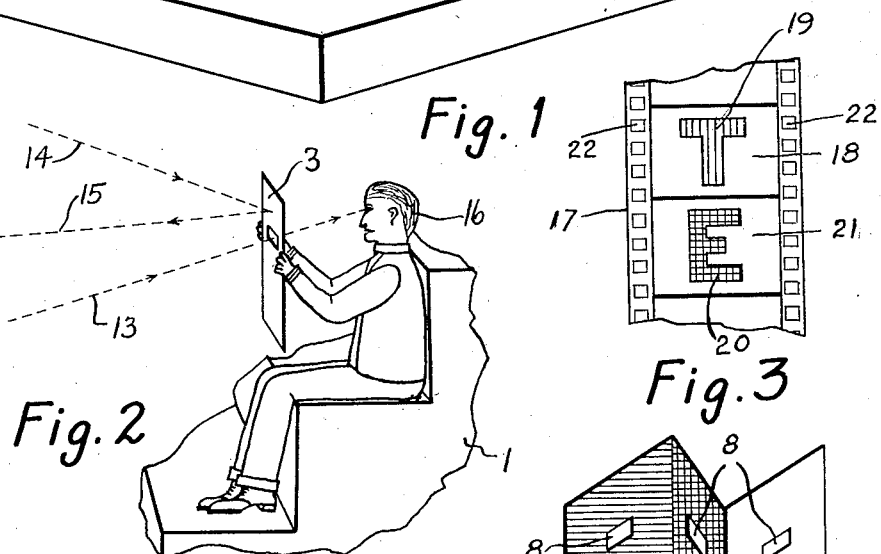
Fig. 2
Fig. 3
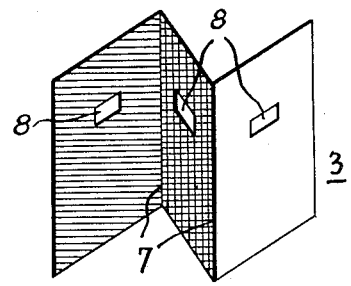
Fig. 5
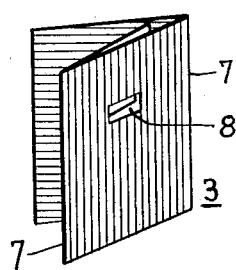
Fig. 4
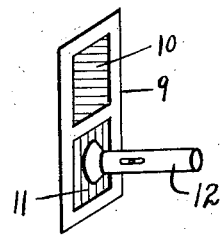
Fig. 6
INVENTOR
Alda V. Bedford.

Patented Oct. 3, 1939

2,174,561

UNITED STATES PATENT OFFICE 2,174,561

DISPLAY APPARATUS AND METHOD

Alda V. Bedford, Collingswood, N. J.

Application December 14, 1938, Serial No. 245,625

4 Claims. (Cl. 88—24)

My invention relates to improvements in the method and apparatus for forming and producing announcements, advertisements, designs, displays, and the like on an impressively large scale.

According to my invention, I optically project a lantern slide or a movable film or the like upon a group of assembled operators. The operators look at the projection lens. Each operator sees light from a different area of the slide to the exclusion of all other areas and, using this light as a cue, each operator holds up for exhibit to spectators a colored object such as a large card of such color that a large scale mosaic picture is formed by the exposed surfaces of the objects. It should be clearly understood that the objects are not appreciably illuminated by the projector in comparison with general illumination supplied by lamps or daylight. Hence the picture or diagram seen by the spectators is not seen by projected light. The sole function of the projector is to cue the operators; the operators create the mosaic picture.

Life magazine for November 15, 1937, pages 14 and 15, shows photographs of large scale diagrams produced by student operators of a university exhibiting cards at a football game for the entertainment of spectators. The operators acted in accordance with separate laboriously written instructions assigned to each student depending upon the seat occupied. Though a single picture formed by this method might be the same as one produced by my method, the use of my invention has several advantages such as follows:

1. More pictures may be presented with reasonable effort by my method because the great labor of preparing the written instructions is avoided.

2. A very important feature of my invention is that operators may respond so quickly to the cues provided that an improved effect of motion in the mosaic picture may be obtained.

3. My invention allows the presentation of extemporaneous subject matter timed to the occasion, since satisfactory slides may be produced very quickly by painting on a blank piece of glass.

4. In my invention the operators are readily informed to change the mosaic picture by changing the slide projected, while in the old method another signal such as the calling of a number is required to inform the operators to produce a next picture.

5. Errors in preparing and distributing the written instructions, which would impair the picture quality, are avoided.

6. My invention also allows use of less skilled or even illiterate operators and is less fatiguing to the operators.

Hence an object of my invention is to produce a large scale mosaic picture consisting of differently colored objects exhibited by operators.

Another object is to present timely extemporaneous subject matter in large scale mosaic picture form.

Another object is to produce a series of mosaic pictures in rapid succession such as to produce appreciable effect of motion in the picture.

Other objects and advantages of my invention will be evident from a detailed study of my method and apparatus.

My invention will be more specifically described in connection with the following figures in which like numerals represent like parts:

Fig. 1 shows a complete assembly adapted to the practice of my invention,

Fig. 2 shows, as for example, one operator holding a card and indicates the light paths, Fig. 3 shows a strip of film which may serve as a slide in the projector used in Fig. 1, Fig. 4 shows one useful type of multiple colored folding card suitable for display by the operators, Fig. 5 shows the card of Fig. 4 folded such as to expose a different pair of colors, and Fig. 6 shows a flashlight and an associated two-section light filter to be used in another embodiment of my invention.

Referring to Fig. 1, I provide a seating structure 1 for supporting a large number of operators that exhibit differently colored cards 2 and 3 in horizontal rows in an inclined plane. (The operators are not shown in Fig. 1 for the sake of clarity due to the cards almost concealing them.) The fragmentary view of Fig. 2 shows the manner in which a typical operator 16 holds a card 3. The "eye" 4 in Fig. 1 symbolically indicates the spectators. The lamp 5 may be of any design suited to illuminate all of the cards with reasonable uniformity. For outdoor assemblages daylight may be used instead of such an artificial light source. The projector 6, which is directed and focused upon the operators, may be of the type commonly used to project still pictures from moving picture type films. Fig. 3 shows a portion of such a film 17 in which the red letter T indicated by numeral 19 on the white background 18 and the black letter E indicated by numeral 20 on the white background 21 are subjects to be reproduced in large scale by the operators. The pictures projected are changed manually by an indexing or detent mechanism that engages the sprocket holes 22 and causes the film to be moved accurately one frame each time a lever is pressed.

There are several commercial examples of a suitable projector, one of which is marked under the trade name "Memo". Alternatively, a conventional lantern slide projector and glass slide could be used. A third type of suitable projector might be of the conventional motion picture type. Such a projector could be run at normal speed but might be run at reduced speed in order to conserve film, since the rate at which the picture subject can be changed is limited by the speed of response of the operators.

The cards 2 and 3 of Fig. 1 are shown in detail in two different positions in Figs. 4 and 5. Each card consists of three stiff pieces of cardboard hinged together along the edges 7 such that it can be folded in six different manners for exhibition of any one of the six sides of the three pieces of cardboard. Apertures 8, which coincide when the cards are folded, are provided to permit the operators to see the projector 6 of Fig. 1 when the cards are held up as shown in Fig. 2.

Fig. 6 shows a flashlight 12 and an associated adjustable light filter 9 having windows 10 and 11 covered respectively with green and red light filter sheets. Such flashlights and filters may be used instead of the cards 3 in practicing my invention.

In operation the picture to be reproduced by the mosaic formation, such as the red letter T on the white background in the film of Fig. 3, is projected upon the operators on the seating structure 1. Each operator sees the light from the projector lens by a path such as path 13 in Figs. 1 and 2. In the example given, the operator behind card 2 would see only red light emanate from the lens while the operator behind card 3 would see only white light. Each operator uses the light seen as a cue and exhibits the card surface having a corresponding color. The spectators then see the mosaic picture by the general illuminating light source 5, the light traveling along paths such as 14 and 15. Due to the low relative light intensities produced by the projector, the spectators do not consciously observe any light from the projector reflected by the cards.

The picture produced is changed by changing the picture projected manually or automatically as by moving the film of Fig. 3. This causes certain of the operators to see a light of a different color emanating from the projector lens and to exhibit a differently colored card surface accordingly. The operators can respond more quickly if consecutive pictures use color combinations which require the cards to be turned around but not refolded.

When the flashlights and color filters as shown in Fig. 6 are used instead of the cards 2 and 3, no appreciable general illumination is used for the best spectacular effect. The operators observe the cues provided by the projector and manually expose the flashlight through the particular window of the filter which transmits light of the color observed.

Many variations in the practice of my invention will be obvious to one skilled in the optical and display arts. For example, the cards to be exhibited might be replaced by colored flags, balloons, hats, or other wearing apparel. Also, by previous agreement, the operators might exhibit an object having a certain color differing from that projected. This would be particularly desirable when black or grey cards are to be exhibited. The cues would be made more positive if, for example, the black card was cued by purple light and the grey card by brown light, since black really means no light, and since a grey light would be white light of less intensity.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim and desire to obtain by United States Letters Patent:

1. In an apparatus adapted to be used by a large number of operators in producing a large mosaic picture consisting of many mosaic elements in an area, means for supporting one of said operators in each section of said area corresponding to each said mosaic element, a slide containing a picture to be reproduced in mosaic form in said area by said operators, a projector for said slide adapted to illuminate said slide and to project light from various regions of said slide upon corresponding sections of said area whereby each said operator sees light from said projector having intensity and color according to the light-transmitting properties of a single region of said slide, suitable colored objects adapted to be displayed individually and simultaneously by said operators selectively in response to the color of said light, said light serving as a cue to said operators, and a relatively strong source of light for illuminating said objects substantially uniformly and so brightly as to efface the effect of the illumination by the projector.

2. The invention of claim 1 characterized in that said objects have apertures or windows through which the operators observe said light from said projector.

3. In an apparatus adapted to be used by a large number of operators in producing a large mosaic picture consisting of many mosaic elements in an area brightly illuminated by general illumination, means for supporting one of said operators in each section of said area corresponding to each said mosaic element, a slide containing a picture to be reproduced in mosaic form in said area by said operators, a projector for said slide adapted to illuminate said slide and to project light from various regions of said slide upon corresponding sections of said area whereby each said operator sees light from said projector having intensity and color according to the light-transmitting properties of a single region of said slide, and suitable colored objects adapted to be displayed individually and simultaneously by said operators selectively in response to the color of said light, said light serving as a cue to said operators.

4. In an apparatus adapted to be used by a large number of operators in producing a large mosaic picture consisting of many mosaic elements in an area, means for supporting one of said operators in each section of said area corresponding to each said mosaic element, a slide containing a picture to be reproduced in mosaic form in said area by said operators, a projector for said slide adapted to illuminate said slide and to project light from various regions of said slide whereby each said operator sees light from said projector having intensity and color according to the light-transmitting properties of a single region of said slide, and suitable manually-controlled lamps each adapted for producing colored light to be displayed individually and simultaneously by said operators selectively in response to the color of light projected from each said region of said slide, said light from said projector serving as a cue for said operators.

ALDA V. BEDFORD.